United States Patent [19]
Walker et al.

[11] Patent Number: 5,651,444
[45] Date of Patent: Jul. 29, 1997

[54] COIN HANDLING APPARATUS AND METHODS OF DETERMINING INFORMATION REGARDING MOVING COINS

[75] Inventors: Robert Sydney Walker, Camberley; Richard Guy Bointon, Plymouth, both of United Kingdom

[73] Assignee: Mars Incorporated, McLean, Va.

[21] Appl. No.: 507,422
[22] PCT Filed: Feb. 25, 1994
[86] PCT No.: PCT/GB94/00382
§ 371 Date: Aug. 25, 1995
§ 102(e) Date: Aug. 25, 1995
[87] PCT Pub. No.: WO94/19774
PCT Pub. Date: Sep. 1, 1994

[30] Foreign Application Priority Data
Feb. 25, 1993 [GB] United Kingdom ............. 9303833

[51] Int. Cl.[6] ........................................ G07D 5/00
[52] U.S. Cl. ................................. 194/317; 367/127
[58] Field of Search ........................ 194/202, 203, 194/317; 453/17; 367/127; 379/145, 146

[56] References Cited

U.S. PATENT DOCUMENTS

| | | | |
|---|---|---|---|
| 1,741,978 | 12/1929 | Courtney | 194/317 |
| 4,392,214 | 7/1983 | Marini et al. | 367/127 |
| 5,085,309 | 2/1992 | Adamson et al. | 194/317 |
| 5,092,816 | 3/1992 | Levasseur | 453/17 |

FOREIGN PATENT DOCUMENTS

| | | |
|---|---|---|
| 0184393 | 6/1986 | European Pat. Off. . |
| 0432996 | 6/1991 | European Pat. Off. . |
| 0470587 | 2/1992 | European Pat. Off. . |
| 0477731 | 4/1992 | European Pat. Off. . |
| 2475769 | 8/1981 | France . |
| 2198232 | 6/1988 | United Kingdom . |

*Primary Examiner*—F. J. Bartuska
*Attorney, Agent, or Firm*—Fish & Richardson P.C.

[57] ABSTRACT

In a coin handling apparatus, a single sensor (30) detects impacts of the coin at different positions within the apparatus, and uses the output to determine the route taken by the coin through the apparatus, and the speed of the coin.

29 Claims, 1 Drawing Sheet

COIN HANDLING APPARATUS AND METHODS OF DETERMINING INFORMATION REGARDING MOVING COINS

FIELD AND BACKGROUND OF THE INVENTION

This invention relates to coin handling apparatus, and is particularly, but not exclusively, concerned with apparatus of the type incorporating a coin validator for determining authenticity of coins, and a coin routing device for directing coins along alternative paths, for example to a reject slot or coin storage location, in dependence upon the output of the coin validator.

In such apparatus it is often desirable to determine the position of a coin within the apparatus. It is well known to provide sensors, e.g. optical, inductive, or piezoelectric, each of which detects when a coin reaches a particular position within the apparatus. See, e.g. EP-A-0 470 587. Typically, several such sensors are provided. The use of such sensors increases the cost of the apparatus, and adds to the difficulty of assembly as a result of both the need to position the sensors accurately and the requirement to provide connecting leads.

SUMMARY OF THE INVENTION

According to one aspect of the present invention there is provided a method of determining which route out of a plurality of alternative routes has been taken by a coin travelling through a coin handling apparatus, the method comprising examining the output of a single sensor responsive to vibrations produced by coin impacts at a plurality of positions throughout the apparatus, and providing a signal indicative of the route taken in dependence upon the nature of said output.

It has been found that a single sensor, e.g. a piezoelectric sensor, mounted on a coin handling apparatus can pick up vibrations produced by coin impacts at different positions within the apparatus, and the pattern of the output of the sensor will differ depending upon the route taken by the coin. In this way, it is possible to use a single sensor where previously two or more were required. (It is to be noted that the term "single" is used to indicate that the apparatus has at least one sensor which can detect impacts at least two different positions; it would be possible to provide one or more additional sensors if desired, or if necessary to detect impacts at further positions.) This could be achieved by examining just the pattern of the output of the sensor. Alternatively, or additionally, if the nature of the impact vibrations, e.g. the frequency and/or amplitude response thereof, varies in dependence on the position of impact, the vibration characteristics can be examined also.

The invention also extends to coin handling apparatus including control means operable to perform the method of the invention. For example, there may be a routing means which directs valid coins to a coin storage location, and which as a result of the insertion of such valid coins issues a credit signal enabling the dispensing of products or the performing of services by a machine. A known fraud technique in such apparatus involves causing an inserted valid coin to be directed to a reject path where it is returned to the user, instead of to the coin storage location. In accordance with the present invention, a coin handling apparatus may include a control means which detects the routing of the coin using a method referred to above, and cancels the credit when it is found that the coin has been directed to the reject path.

The credit signal is often generated in response to the coin passing what is known as the "post-gate sensor", which is located downstream of the accept gate through which pass coins deemed to be valid. In an arrangement of the invention, the routing detection technique described above could be used to trigger the credit signal when a coin is determined to have taken the accept path. However, for added reliability, it is preferred that the post-gate sensor be retained, and for the credit signal to be triggered in response either to the post-gate sensor alone, or to a combination of an output from the post-gate sensor and an indication from the routing-detection arrangement that the coin has taken the accept path.

In addition, or alternatively, the arrangement is preferably such that a signal indicative of a fault or error condition may be generated in dependence upon the route which is indicated by the signal. Thus, if the apparatus is arranged to control the routing of a coin so that it is directed to a particular destination, but the signal derived from the sensor indicates that it has taken a different route, an error or fault signal may be provided and appropriate action taken. For example the signal may be provided as an external output signal (e.g. indicative of attempted fraud) and could be used to generate an alarm, switch off the machine, turn on a video camera, etc.

Preferably, the arrangement is such that a signal indicative that a particular route has been taken will only be provided if the sensor has detected at least one impact associated with that route. Accordingly, the sensor is preferably arranged to be capable of detecting impacts at a plurality of positions each associated with a respective one of the different routes. In addition, the sensor is preferably also arranged to sense an impact at at least one position which is common to at least a plurality of the routes.

Preferably, the sensor is operable to detect the coin reaching at least three discrete positions within the apparatus. Preferably, at least two of these are known positions. A further sensed position may vary depending upon the route taken by the coin. A normalization procedure may be adopted using the response of the sensor to the coin reaching the two known positions for reliably distinguishing between the different signals produced in response to the alternative further positions being reached in dependence upon the different routing of the coin.

It is to be noted that the speed of the coin may be determinable from the sensor output. For example, if a normalization procedure is adopted the outputs generated by the sensor when the coin reaches the two known positions may give an indication of coin speed, which can then be used to predict the time at which the coin reaches the further position, which may vary depending upon the routing of the coin. Even if normalization is not used, coin speed may still be calculable by detecting the time between the coin reaching two positions which are sensed by the sensor.

A separate aspect of the invention relates to a method of determining the speed of a coin travelling through a coin handling apparatus, the method comprising examining the output of a sensor responsive to vibrations resulting from impacts of a coin at different positions in the apparatus, and calculating coin speed in accordance with the time between signals within the output representing impacts produced when the coin reaches particular positions.

The invention also extends to a coin handling apparatus having a control means which evaluates coin speed in this way. The evaluation of coin speed may be used for a number of purposes, e.g. for determining when speed has been altered as a result of the coin being attached to a string which is sometimes done in order to defraud a coin validator.

An arrangement embodying the present invention will now be described by way of example with reference to the accompanying drawings.

DETAILED DESCRIPTION OF THE INVENTION

Figure 1:
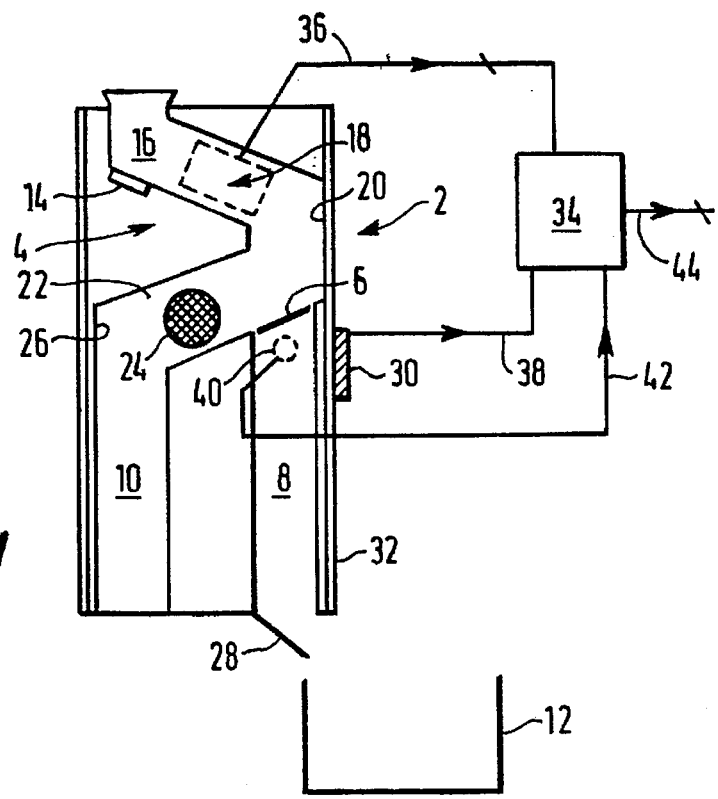
FIG. 1 is a schematic diagram illustrating a coin handling apparatus in accordance with the present invention.

Referring to FIG. 1, a coin handling apparatus (2) comprises a coin validator generally indicated at (4) followed by a routing arrangement comprising a gate (6) which can be opened to permit coins leaving the validator to enter an accept path (8), or can be left closed so that coins will be deflected by the gate into a reject path (10). The accept path (8) may lead to a coin storage means such as a change tube and/or a cashbox (12). The reject path (10) directs coins to the user of the apparatus.

Within the validator (4) there is a "snubber" (14) of known type onto which inserted coins fall. The snubber (14) absorbs much of the kinetic energy of the coin. The coin then travels along a path (16 past a testing station (18), and then impacts a side wall (20) before dropping towards the gate (6). If the gate (6) is closed, the coin is deflected such that it travels along a path (22), as indicated at (24), and then hits a further side wall (26) before falling into the reject path (10). If the gate is open, the coin falls straight into the accept path (8), and then impacts a deflecting surface (28).

The various impacts of the coin are sensed by a sensor (30) mounted on a metal channel (32) within which the apparatus (2) is housed. The sensor may be a piezoelectric sensor, or other acoustic sensor. It is arranged such that it is sensitive to noise transmitted through the structure of the apparatus, but insensitive to airborne noise.

A control means (34) is responsive to outputs (36) from the testing station (18) for classifying inserted coins, and to an output (38) from the sensor (30) for determining information regarding movement of coins in the apparatus. A post-gate sensor (40) located below the gate (6) detects the presence of a coin and has an output (42) which is also presented to the control means (34). Outputs (44) control the operation of a vending machine or the like.

The output of the sensor (30) throughout a predetermined period is subjected to processing in order to simplify and smooth the signal waveform, and then to detect the route taken by a coin. This predetermined period is initiated upon, or at a predetermined delay after, the occurrence of a particular event. This event may be the generation of the signal which opens the gate (6), or a signal generated by a further coin-detecting sensor such as a discrete arrival sensor or a sensor of the station (18). Arrival sensing techniques using discrete arrival sensors or coin-testing sensors are well known in the art. It will be understood that if desired, the signal processing of the sensor output may be performed only if a coin is tested and determined to be valid.

The output of the sensor (30) can be converted into successive data values each indicative of the frequency of the vibration sensed by the sensor. Various mathematical algorithms are known for operating on successive data values of this type in order to provide a simplified output. Preferably, the Convex Shape Hull Simplification technique is used. This creates a window over the data whose length is predetermined (e.g. 50 data points). The technique draws a line from the left hand edge of the window to all the data points within the window. It then searches for the steepest of these lines (either positive or negative). When this line is found it is broken up into the same number of data points so that the record remains the same length. The window is then moved to this new point and the process is repeated over the entire length of the record. This technique turns the waveform into a series of straight lines but retains the major features, peaks, etc.

The Savitzky Golay method is then used to smooth the resulting waveform. This is based on the mean of 'n' data points (e.g. 9) and rounds the data to look similar to the original waveform.

Figure 2:
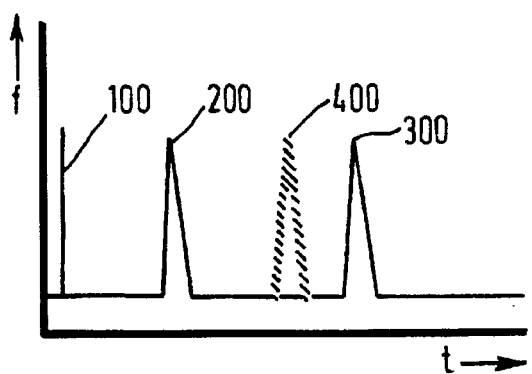
FIG. 2 is a graph illustrating typical outputs from the sensor after processing thereof.

The resulting waveform may for example look like that shown in FIG. 2, in which the abscissa represents time and the ordinate represents frequency. This illustrates at 100 the time of an initial detectable event 100 (e.g. a signal from a separate arrival sensor) and at 200 and 300 individual peaks representing the impact of the coin with the side wall (20) and the deflecting member (28) in the accept path (8), assuming that the coin is determined to be valid. If the coin is not determined to be valid and is instead directed into the reject path (10), the peak 300 will not occur, and instead a peak 400 representing the impact of the coin with the side wall (26) will appear.

The route adopted by the coin can thus be determined by detecting whether a peak 300 appears, or whether a peak 400 appears in the output of the sensor. It will be appreciated that the exact time at which a peak appears may depend upon the velocity of the coin. Therefore, it might be possible for the two peaks 300 and 400 to be confused. To avoid this, preferably there is a normalization step whereby the time between two events (e.g. the event 100 and the peak 200) can be used to determine the expected times at which the peaks 300 and 400 appear so that these times are accurately predictable irrespective of the coin speed.

On the basis of the above description, it will be apparent to those skilled in the art that there are a number of different ways in which the signals from the sensor can be processed in order to perform the determination of whether a peak 300 or a peak 400 has appeared in the output. By way of example, one possibility would be to perform a feature extraction on the simplified waveform mentioned above, so that the times at which particular peaks occur are determined. A standard normalization technique can be applied, and the resulting data can then be passed through a known form of classifier, e.g. a linear discriminant classifier, to judge whether or not the peaks 300 and 400 have appeared.

Figure 3:
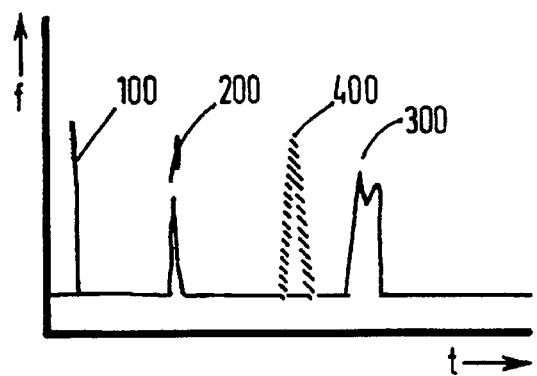
FIG. 3 is similar to FIG. 2 but illustrates outputs in a modified embodiment of the invention.

The different impacts produced by a coin travelling through the apparatus may generate vibrations of different characteristics, for example some impacts producing briefer, higher-frequency vibrations than others. Indeed, the apparatus can be manufactured to ensure that this occurs, for example by including special-purpose inserts at predetermined positions along the coin path, the inserts being made of materials selected so as to produce distinctive vibrations upon impact by coins. FIG. 3 shows the output of a sensor (30) in such an arrangement, and it will be noted that the individual peaks have different forms. In such an arrangement, added reliability can be provided by a processing technique whereby individual peaks are recognised only if they occur within an expected interval and only if they have expected characteristics for example in terms of duration, frequency and/or amplitude. Alternatively, the peaks could be recognised solely on the basis of their characteristics, rather than on the time at which they occur. This could be achieved for example by performing a Fourier transform on the output of the sensor (30), for example to convert the output to the frequency domain, and then recognising the presence of a peak only if the appropriate characteristics are found to be present in the output.

If desired, the sensor (30) could also be used to test whether the coin is valid. The use of piezoelectric sensors for checking coin validity is well known in the art. See for example GB-A-2 236 609. The operation of the apparatus is as follows. If a coin has been judged to be valid, the control means (34) can be arranged to generate a credit signal only if a signal is received from the post-gate sensor (40) and no peak 400 is detected, a peak 400 thus inhibiting any credit signal and preventing operation of the vending machine or the like. The presence of a peak 300 may also be required to generate the credit signal. Also, the control means (34) can be arranged to detect the coin speed from the interval between at least two of the peaks, and to cancel credit if the coin is travelling unusually slowly, i.e. if the speed is less than a predetermined value.

We claim:

1. A method of determining which route out of a plurality of alternative routes has been taken by a coin travelling through a coin handling apparatus, wherein the method comprises examining the output of a single sensor responsive to vibrations produced by coin impacts at a plurality of positions throughout the apparatus so as to distinguish between a first type of output produced in response to a coin travelling along a first route and a second type of output produced in response to a coin travelling along a second route, and providing either a signal indicating that the first route has been taken or a signal indicating that the second route has been taken depending upon the type of said output.

2. A method as claimed in claim 1, including the step of determining the route taken by the coin in accordance with the time at which signals indicative of an impact occur.

3. A method as claimed in claim 2, including a normalizing step to determine the expected time of a sensor output produced by a particular impact.

4. A method as claimed in claim 1, including the step of determining the route taken by a coin according to the characteristics of signals representing an impact.

5. A method as claimed in claim 1, for use in a coin handling apparatus including a coin validator for providing a signal indicating the presence of a genuine coin, so as to enable the generation of a credit value in response thereto, the method including the step of inhibiting said credit value depending on the route determined to have been taken by the coin.

6. A method as claimed in claim 1, including the step of determining the speed of the coin from the output of said sensor.

7. A method as claimed in claim 2, for use in a coin handling apparatus including a coin validator for providing a signal indicating the presence of a genuine coin, so as to enable the generation of a credit value in response thereto, the method including the step of inhibiting said credit value depending on the route determined to have been taken by the coin.

8. A method as claimed in claim 3, for use in a coin handling apparatus including a coin validator for providing a signal indicating the presence of a genuine coin, so as to enable the generation of a credit value in response thereto, the method including the step of inhibiting said credit value depending on the route determined to have been taken by the coin.

9. A method as claimed in claim 4, for use in a coin handling apparatus including a coin validator for providing a signal indicating the presence of a genuine coin, so as to enable the generation of a credit value in response thereto, the method including the step of inhibiting said credit value depending on the route determined to have been taken by the coin.

10. A method as claimed in claim 2, including the step of determining the route taken by a coin according to the characteristics of signals representing an impact.

11. A method as claimed in claim 3, including the step of determining the route taken by a coin according to the characteristics of signals representing an impact.

12. A method as claimed in claim 1, wherein each of said first and second types of outputs are produced in response to a plurality of impacts.

13. A method as claimed in claim 12, wherein there is a common position in both of said first and second routes, and wherein each of said first and second types of outputs includes a signal generated in response to an impact at said common position.

14. A method as claimed in claim 5, including the step of providing the credit value, unless inhibited, in response to the output of a further sensor positioned to sense a coin which has passed an accept gate which is arranged to control the routing of coins according to whether they are to be accepted or rejected.

15. A method as claimed in claim 5, including the step of determining the speed of the coin from the output of said sensor, and inhibiting said credit value in response to determining that the coin has travelled at less than a predetermined speed.

16. A method as claimed in claim 1, including the step of generating an alarm depending upon the route which the coin has been determined to have taken.

17. A method as claimed in claim 1, including the step of providing a signal indicating the route taken by the coin as an external output signal.

18. A method of determining the speed of a coin travelling through a coin handling apparatus, wherein the method comprises examining the output of a sensor responsive to vibrations resulting from impacts of a coin at different positions in the apparatus, and calculating coin speed according to the time between signals within the output representing impacts produced when the coin reaches particular positions.

19. A method as claimed in claim 18, for use with a coin validator operable to provide a signal indicating the presence of a valid coin to enable the generation of a credit value in response thereto, the method including the step of inhibiting said credit value in response to determining that the speed of the coin is less than a predetermined value.

20. Coin handling apparatus comprising control means for providing a signal indicative of which of a plurality of alternative routes has been taken by a coin, and a sensor responsive to vibrations produced by coin impacts at a plurality of positions in the apparatus, said control means being operable to examine the output of the sensor and to distinguish between a first type of output produced in response to a coin travelling along a first route and a second type of output produced in response to a coin travelling along a second route, said control means being operable to provide either a signal indicating that the first route has been taken or a signal indicating that the second route has been taken depending upon the type of said output.

21. Coin handling apparatus as claimed in claim 20, wherein the control means is further operable in response to the output of the sensor to provide a signal indicative of the speed of the coin.

22. Coin handling apparatus as claimed in claim 20, the apparatus including a validator for determining authenticity of inserted coins, routing means for controlling the routing of coins in response to the output of the validator, and means for generating a credit value in response to the output of the validator, wherein the control means is operable to inhibit said credit value in response to determining, from the output of said sensor, that the coin has been routed in a manner which is inappropriate with respect to the output of the validator.

23. Coin handling apparatus as claimed in claim 22, wherein the validator is operable to determine authenticity at least partially in response to the output of the sensor.

24. Coin handling apparatus as claimed in claim 20, wherein each of said first and second types of outputs is produced in response to a plurality of impacts.

25. Coin handling apparatus as claimed in claim 22, including a further sensor for detecting an accepted coin which has passed the routing means, the apparatus being operable to generate said credit value, unless inhibited, in response to the output of the further sensor.

26. Coin handling apparatus as claimed in claim 22, wherein the control means is operable to inhibit said credit value in response to determining, from the output of said sensor, that the coin has travelled at less than a predetermine speed.

27. Coin handling apparatus comprising control means for providing a signal indicative of the speed of the coin, and a sensor responsive to vibrations produced by coin impacts at a plurality of positions in the apparatus, said control means being operable for examining the output of said sensor so as to provide said signal in response thereto.

28. Coin handling apparatus as claimed in claim 27, the apparatus including a validator for determining authenticity of inserted coins, routing means for controlling the routing of coins in response to the output of the validator, and means for generating a credit value in response to the output of the validator, wherein the control means is operable to inhibit said credit value in response to determining, from the output of said sensor, that the coin has travelled at less than a predetermined speed.

29. Coin handling apparatus as claimed in claim 28, wherein the validator is operable to determine authenticity at least partially in response to the output of the sensor.

* * * * *